United States Patent
Güntherberg et al.

[11] Patent Number: 5,958,316
[45] Date of Patent: *Sep. 28, 1999

[54] PREPARATION OF THERMOPLASTICS

[75] Inventors: Norbert Güntherberg, Speyer; Jürgen Hofmann, Ludwigshafen; Hilmar Ohlig, Kaiserslautern; Elmar Mailahn, Worms; Klaus Bus, Kaiserslautern; Bernhard Czauderna, Hirschberg; Sven Grabowski, Ludwigshafen, all of Germany

[73] Assignee: BASF Aktiengesellschaft, Ludwigshafen, Germany

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/620,308
[22] Filed: Mar. 22, 1996
[51] Int. Cl.$^6$ ............... B29C 47/40; B29C 47/76
[52] U.S. Cl. ............... 264/101; 264/102; 264/211.23; 264/349; 425/203; 366/75
[58] Field of Search ............... 264/101, 102, 264/211.23, 349; 425/203, 204, 208, 209; 366/75, 78

[56] References Cited

U.S. PATENT DOCUMENTS

| | | | |
|---|---|---|---|
| 3,742,093 | 6/1973 | Skidmore | 264/349 |
| 3,796,677 | 3/1974 | Laber et al. | |
| 4,065,532 | 12/1977 | Wild et al. | 264/349 |
| 4,110,844 | 8/1978 | Nakamura | 425/203 |
| 4,136,251 | 1/1979 | Bice et al. | 264/349 |
| 4,423,960 | 1/1984 | Anders | 366/75 |
| 4,802,769 | 2/1989 | Takana | 366/75 |
| 5,088,914 | 2/1992 | Brambilla | 264/211.23 |
| 5,151,026 | 9/1992 | Andersen et al. | 425/204 |
| 5,232,649 | 8/1993 | Andersen et al. | 264/211 |

FOREIGN PATENT DOCUMENTS

| | | |
|---|---|---|
| 118 847 | 9/1984 | European Pat. Off. |
| 233 371 | 8/1987 | European Pat. Off. |
| 534235 | 3/1993 | European Pat. Off. |
| 1579106 | 3/1963 | Germany |
| 2037784 | 7/1970 | Germany |
| 3026842 | 7/1980 | Germany |

(List continued on next page.)

*Primary Examiner*—Mathieu D. Vargot
*Attorney, Agent, or Firm*—Keil & Weinkauf

[57] ABSTRACT

Toughened thermoplastics are prepared by mechanically dewatering a water-moist elastomer component A containing up to 50% by weight of residual water and mixing the resulting dewatered elastomer component A' with a thermoplastic polymer B in a mixing unit, by a process in which the elastomer component A is fed to a twin-screw extruder which has corotating screws and essentially includes, in the transport direction, one unheated metering section in which the elastomer component A is fed to the extruder by a metering means, at least one unheated squeeze section which serves for dewatering and contains at least one retarding element and in each case at least one associated dewatering orifice, at least one section in which the thermoplastic polymer B is introduced as a melt into the extruder, at least one section provided with mixing, kneading or other plasticating elements or combinations of these elements, at least one devolatilization section which is provided with at least one devolatilization orifice and in which the residual water is removed as steam, and a heated discharge zone, and in which the water emerging from the dewatering orifices is present partially or completely in the liquid phase.

11 Claims, 1 Drawing Sheet

FOREIGN PATENT DOCUMENTS

| | | |
|---|---|---|
| 57-167303 | 10/1982 | Japan . |
| 60-036502 | 2/1985 | Japan . |
| 1123852 | 5/1989 | Japan . |
| 1123853 | 5/1989 | Japan . |
| 1202406 | 8/1989 | Japan . |
| 2286208 | 11/1990 | Japan . |
| 4008754 | 1/1992 | Japan . |
| 4139202 | 5/1992 | Japan . |
| 4311704 | 11/1992 | Japan . |

PREPARATION OF THERMOPLASTICS

BACKGROUND OF THE INVENTION

1. Field of the Invention

The present invention relates to a novel process for the preparation of toughened thermoplastics by mechanically dewatering a water-moist elastomer component A containing up to 50% by weight of residual water and mixing the dewatered elastomer component A' with a thermoplastic polymer B in an extruder.

The present invention furthermore relates to special embodiments of the stated process, including those using certain components A and B, and to molding materials prepared by the process and to the use of the molding materials for the production of films, fibers and moldings.

2. Description of the Related Art

Particulate rubbers, which may be grafted or ungrafted, are frequently used as elastomer components for toughening thermoplastics or other plastics. Such rubbers are usually prepared in aqueous systems, for example by emulsion or suspension polymerization. The particles formed in the suspension polymerization or precipitated in the emulsion polymerization by the addition of a coagulating precipitating agent are generally washed with water and dewatered by a suitable dewatering method, such as sieving, filtration, decanting, centrifuging or partial drying at elevated temperatures, for example by means of a flow dryer or a spray dryer. Partially dewatered products are obtained in every case.

Frequently used graft rubbers are, for example, polybutadiene grafted with a styrene/acrylonitrile copolymer (SAN) and poly-n-butyl acrylate grafted with such a copolymer, or rubbers composed of a plurality of graft stages based on butadiene, styrene, n-butyl acrylate, methyl methacrylate and/or acrylonitrile.

The residual water content of the rubber obtained after the partial dewatering is up to 50% by weight and is usually removed by energy-consumptive drying. The dried rubber obtained as a powder is finally incorporated, with melting, into the thermoplastics present as powder or granules, the end product being formed. The rubber powder tends to undergo spontaneous ignition during drying and incorporation into the thermoplastics, owing to the fine dust content.

According to a proposal described in DE-A-20 37 784, partially dewatered graft rubber can be introduced into an SAN melt with evaporation of the water and a thermoplastic containing this graft rubber can be obtained. This process requires the use of a relatively large amount of electrical energy.

EP-A 534 235 describes a process for the preparation of toughened thermoplastics by incorporating mechanically partially dewatered rubber into thermoplastic at above the softening point of the thermoplastic, the incorporation being effected in a main extruder and the partial dewatering of the rubber in a side extruder located laterally with respect to the main extruder. The residual water remaining in the rubber is removed as steam during the incorporation, through devolatilization orifices present before and after the feed point.

The disadvantage of this process is the necessity of having to operate two extruders to prepare the impact-resistant thermoplastic. Moreover, the dewatering of the rubber in the side extruder is not complete, so that a large amount of water has to be evaporated in the main extruder.

U.S. Pat. No. 5,151,026 describes an extruder in which comminuted and washed plastics wastes whose water content is up to 50% by weight are dewatered. For this purpose, the extruder, which otherwise has a right-handed thread in the usual manner, contains short sections having a left-handed thread. The application U.S. Pat. No. 5,232,649 arising out of this U.S. publication describes the corresponding process.

Japanese publication JP 22 86 208 describes a twin-screw extruder for dewatering thermoplastic molding materials, whose right-handed screws each have two sections possessing left-handed threads. The water emerges as liquid through Seiher barrels—sieve-like inserts in the extruder barrel—and as steam through devolatilization orifices. However, the Seiher barrels tend to become blocked by emerging polymer material, as is described, for example, in DE 15 79 106 for the dewatering of synthetic rubber.

JP-A 1/202 406 likewise describes a process in which moist rubber-like polymers are initially partially dewatered in a zone provided with Seiher barrels in an extruder and thereafter the residual water is removed in a devolatilization zone under atmospheric pressure and three subsequent devolatilization zones under reduced pressure. This process also includes a complicated devolatilization zone at reduced pressure, in addition to the susceptible Seiher barrels.

U.S. Pat. No. 4,802,769 describes an extruder in which an aqueous slurry of a rubber polymer and a styrene/acrylonitrile copolymer are processed to give a thermoplastic. The water emerges as a liquid through Seiher barrels and as steam through a three-stage devolatilization. In addition to the Seiher barrels which become blocked, disadvantages are that the extruder section provided with Seiher barrels is heated and that multiple pressure build-up occurs in the devolatilization section as a result of retarding elements, with the result that the polymer material is subjected to considerable thermal and mechanical stress.

DE 30 26 842 describes a twin-screw extruder for the devolatilization of thermoplastics, in whose devolatilization and discharge zone the screw roots have a smaller diameter, and the twin-screw barrel a larger diameter, than the preceding zones. Small amounts of water are added to the thermoplastic. In the wider devolatilization zone operated under reduced pressure, steam is formed with the foaming of the thermoplastic and entrains the residual monomers to be removed. As a result of the foaming of the thermoplastic melt, the operation under reduced pressure is relatively susceptible to faults.

SUMMARY OF THE INVENTION

It is an object of the present invention to provide a process which does not have the disadvantages described. In particular, it is intended to provide a process which permits the preparation of an impact-resistant thermoplastic from a water-moist elastomer component and a thermoplastic, brittle polymer in a technically simple manner, as far as possible in one process step.

We have found that this object is achieved by the process defined at the outset, wherein the elastomer component A is fed to a twin-screw extruder which has corotating screws and essentially comprises, in the transport direction, a metering section in which elastomer component A is fed to the extruder by a metering means, at least one squeeze section which serves for dewatering and contains at least one retarding element and in each case at least one associated dewatering orifice, at least one section in which the thermoplastic polymer B is introduced as a melt into the extruder, at least one section provided with mixing, kneading or other plasticating elements or combinations of these elements, at least one devolatilization section which is provided with at least one devolatilization orifice and in which the residual water is removed as steam, and a discharge zone, and wherein the water emerging from the dewatering orifices is present partially or completely in the liquid phase.

We have also found particular embodiments of the process with respect to the form of the extruder and of the components A and B used, the thermoplastic molding materials prepared by the process and the use of these molding materials for the production of films, fibers and moldings.

BRIEF DESCRIPTION OF THE DRAWINGS

The FIGURE of the drawing schematically sets forth the extruder of the present invention.

The principle of the process and the preferred embodiments of the process are described below, those components of the extruder which are defined as sections or zones not necessarily being identical to the individual components, such as barrel parts, and screw segments, from which the extruder is assembled. A section or zone consists as a rule of a plurality of components. The numbers stated in connection with the sections or zones relate to FIG. 1.

DESCRIPTION OF THE PREFERRED EMBODIMENTS

Figure 1:
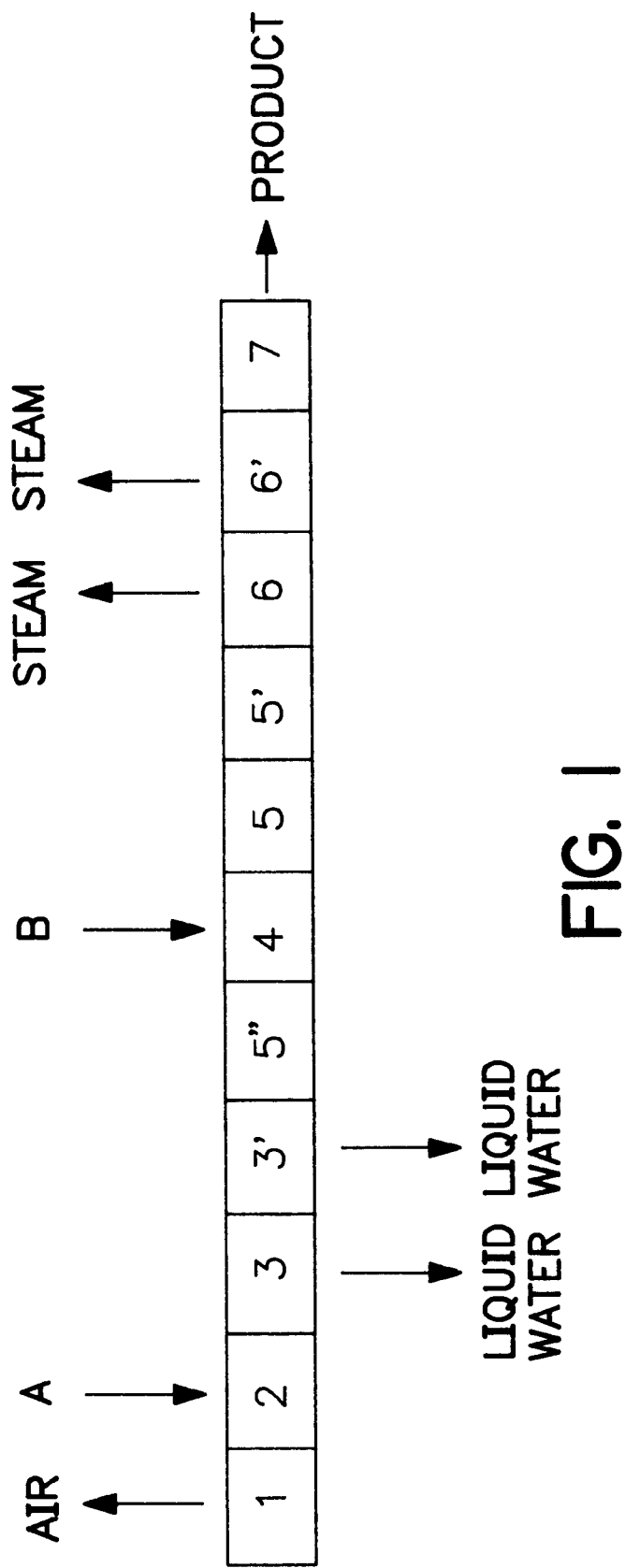

The water-moist elastomer component A containing up to 50% by weight of residual water, for example a water-moist elastomer prepared by precipitation of a graft rubber obtained by emulsion polymerization and partially dewatered to a residual water content of up to 50% by weight— where the partial dewatering may be effected, for example, by filtration, decanting, centrifuging and/or thermal drying—is fed to the metering section 2 of the extruder, the metering section usually consisting of an automatic metering means and the actual metering orifice. The metering means is in the form of, for example, a conveying screw which conveys or forces the material into the metering orifice. It is also possible for component A to be metered by suitable gravimetric or volumetric metering means and to be metered into the feed orifice of the extruder under the action of gravity. By means of a suitable screw geometry in the metering section, it is ensured that the component A is drawn in and deaerated. Alternatively, entrapped air can also escape through a deaeration section 1 which is located upstream against the transport direction of the extruder and typically has one or more vent orifices.

The water-moist elastomer component is conveyed downstream into the first squeeze section.

In the first squeeze section 3, a considerable part of the residual water contained in the elastomer component is mechanically removed. The material is conveyed against a retarding element which acts as an obstacle and, as a rule, is present at the end of the squeeze section. This causes a build up in pressure, which forces the water out of the elastomer component. Depending on the Theological behavior of the rubber, the pressure can be built up by different arrangements of screw elements, kneading elements or other retarding elements. In principle, all commercial elements which build up pressure are possible.

Examples of possible retarding elements are pushed-over, conveying screw elements screw elements having a pitch opposite to the transport direction kneading blocks having non-conveying kneading disks of different widths kneading blocks having back-conveying pitch kneading blocks having conveying pitch cylindrical disks, cams and blocks configured therefrom neutral flow restrictors mechanically adjustable flow restrictors (sliding housings, radial flow restrictors, central flow restrictors).

Two or more of the retarding elements may also be combined with one another. Furthermore, the retarding effect can be adapted to the particular elastomer by the length and intensity of the individual retarding elements.

In the first squeeze section, all structural features and all operating parameters of the extruder are preferably matched up with one another in such a way that, at the chosen screw speed, the elastomer material is conveyed and compressed but is plasticated or partially melted only to a minor extent, if at all, and is not completely melted.

The squeeze section 3 of the extruder preferably contains, for building up a pressure, screw elements having a pitch opposite to the transport direction and/or corresponding kneading blocks.

The water forced out of the elastomer material in the squeeze section leaves the extruder in a liquid phase and not as steam. In a less preferable embodiment, up to 20% by weight of the water removed in this section emerge as steam.

The squeeze section is provided with one or more dewatering orifices which as a rule are under atmospheric pressure. They are preferably roughly in the middle of the squeeze section and as a rule at the top of the extruder. Furthermore, the dewatering orifices are preferably provided with an apparatus which prevents the emergence of the conveyed elastomer A which may be under superatmospheric pressure. Retaining screws are particularly preferably used for this purpose.

The temperature of the emerging water is in general from 20 to 50° C., preferably from 25 to 40° C., measured at the outlet orifice.

In the first squeeze section, usually from 10 to 90, preferably from 25 to 80, % by weight of the residual water initially present are removed, depending on the elastomer component and on the residual water content initially present.

If the elastomer component is a particulate graft rubber, it is as a rule very predominantly in powder form after passing the first retarding zone.

The partially dewatered elastomer component A is transported away via the retarding zones and enters the next extruder section.

In a preferred embodiment, the first squeeze section 3 just described is followed by a second squeeze section 3', which in turn consists of a conveying section and a retarding zone acting as an obstacle. Essentially the same statements as those made with regard to the first squeeze section 3 are applicable to this section.

In the second squeeze section, the elastomer component is further dewatered, up to 50, preferably from 5 to 35, % by weight of the water present initially (before the extrusion) once again being removed. As a result of the mechanical energy introduced by the rotating extruder screw, the temperature of the elastomer component increases in the second squeeze section, generally to values up to 250° C.

From 20 to 99% by weight of the water removed in this section emerges as liquid, and the remainder to 100% by weight emerges as steam. However, the dewatering orifices are preferably designed in such a way that the amount of water emerging in liquid form is 70% by weight or more, inspite of the high material temperature. For this purpose, the geometries of the extruder screws and of the retaining screws are designed in such a way as is known to the skilled worker from the prior art.

As a rule, the water temperature at the outlet orifice is from 40 to 130° C., preferably from 50 to 95° C.

The extruder may contain further squeeze sections downstream of the second squeeze section 3', particularly when the initial residual water content of the elastomer component A is high or when the desired product properties make this necessary.

After passing the final squeeze section, the elastomer component has been freed from the major part of the residual water (component A') and enters a section 4 in which one or more feed orifices for the thermoplastic polymer B are present. It is advantageous if the polymer B is introduced in the form of its melt. If the section contains a plurality of feed orifices, these may be arranged, for example, in series along an imaginary axis in the longitudinal direction of the extruder, circularly along the extruder circumference or along an imaginary helix around the extruder.

The melt of the polymer B can be fed in by means of an extruder, but preferably by technically simple conveying means, such as melt pumps or metering screws.

In the region of section 4, in which the melt of the thermoplastic polymer B is introduced, the screw is advantageously in the form of a conveying screw which is capable of homogenizing the mixture of elastomer component A and the melt of the thermoplastic B only to a small extent.

The section to which the thermoplastic melt B is to be fed is followed by a section 5 which is provided with mixing elements, kneading elements or other plasticating elements or combinations of these elements (plasticating section).

The plasticating elements homogenize the polymer mixture with simultaneous melting of the dewatered elastomer component A'.

Suitable plasticating elements are the components familiar to a person skilled in the art, for example screw elements having a small pitch in the transport direction, kneading blocks having narrow or broad, conveying or non-conveying kneading disks, screw elements having a pitch opposite to the transport direction, or a combination of such elements. Here, it is possible to employ any commercially available component used for plasticating. The choice of the plasticating elements in the plasticating section with regard to their type, number and dimensioning depends on the components of the polymer mixture, in particular on the viscosity and softening temperature and on the miscibility of the components.

The extruder may have one or more further plasticating sections 5' after the plasticating section described if the homogenization and the melting of the mixture was not complete in the first plasticating section.

The statements made with regard to the first plasticating section are applicable to the further plasticating section or sections.

In a preferred embodiment, the melt of the thermoplastic polymers B is fed to the extruder at the beginning of the plasticating section. In this embodiment, the section for the thermoplastic feed 4 accordingly coincides with the beginning of the plasticating section 5.

In a further particular embodiment of the extruder, one or more further plasticating sections are present before the section 4, in which the melt of thermoplastic polymer is introduced, ie. downstream of the final squeeze section. In this plasticating 5", the very substantially dewatered elastomer component A', for example the rubber powder is first homogenized and plasticated alone.

The melt of the thermoplastic polymer B is accordingly introduced in this embodiment into a viscous melt of the elastomer component A'. In this case, the plasticating section 5 following the mixing of melt B (section 4) serves only for homogenizing the mixture of the two components which are already present in the plastic state and therefore contains, as a rule, fewer mixing elements than the plasticating sections already described.

Which of the variants described for feeding melt B, ie.:
  into a conveying section upstream of the plasticating section,
  at the beginning of the plasticating section,
  into a conveying section between two plasticating sections
is chosen depends on the physical and chemical properties of the components to be mixed. The viscosities of the melts of elastomer component A' and thermoplastic polymer B, the softening temperatures of the components, their thermal stability or tendency to decompose at relatively high temperatures, the compatibility in terms of miscibility or wettability of the components, the residual water content of the polymer mixture comprising elastomer component A' and thermoplastic polymer B and, in the case of a particulate rubber as elastomer component A, its particle size and particle size distribution may be mentioned merely by way of example.

The final plasticating section is followed by one or more devolatilization sections 6 and 6', each of which is provided with one or more devolatilization orifices. In the devolatilization sections, the remaining residual water, which was not mechanically removed in the squeeze sections, is partly or completely removed. Owing to the temperatures of the polymer melt, which are usually above 100° C., the water generally emerges completely as steam. The energy required for evaporating the water was introduced into the plasticating sections.

The devolatilization orifices are preferably present at the top of the extruder or on the side of the extruder near the top. However, other arrangements are also possible; in this context, cf. the statements made in connection with the position of the feed orifices for the melt of the thermoplastic polymer B, which are also applicable in appropriate terms to the devolatilization orifices.

The devolatilization orifices may be operated under atmospheric pressure, reduced pressure or superatmospheric pressure, and all devolatilization orifices may be at the same pressure or at different pressures. In the case of reduced pressure, the absolute pressure is usually from 100 to 500 mbar; in the case of devolatilization under superatmospheric pressure, the absolute pressure is as a rule brought to a pressure of up to 20 bar. However, it is preferable to operate the devolatilization sections under atmospheric pressure.

The number of devolatilization sections and the number, arrangement and dimensioning of the devolatilization orifices depend on the water content of the polymer entering the devolatilization sections and on the desired water content of the end product. In a preferred embodiment, an extruder having one or two devolatilization orifices is used.

The devolatilization orifices of the devolatilization sections may be provided with apparatuses, for example retaining screws, which prevent the conveyed material from emerging from the extruder through the orifices. However, in a preferred embodiment such apparatuses are not required.

After a considerable amount of the residual water contained in the elastomer component A has been removed in the squeeze sections 3 and 3', only from about 10 to 60, preferably from 20 to 40, % by weight of the residual water contained in the elastomer component A prior to extrusion are removed in all devolatilization sections 6 and 6' together.

In the region of the devolatilization sections, the extruder screws are as a rule in the form of conventional conveying screws. For the purposes of this application, conventional conveying screws are elements having an earth mixer profile (completely self-purging), elements having a thrust edge, elements having a trapezoidal profile and elements having a rectangular profile, and, in contrast to the number of flights of the squeeze section, the screws may also be equipped with a smaller or larger number of flights. Here, double-flight and single-flight screw elements may also be used.

The final section of the extruder is the discharge zone 7. It consists of a conveying screw and a closed housing part which is terminated by a defined discharge orifice. A die head which is in the form of, for example, a die plate or die strip is preferably used as the discharge orifice, and the dies may be circular (breaker plate), slot-like or of another design. The product discharged as an extrudate in the case of a die plate is cooled in the usual manner, for example in water, and granulated. Granulation to give cubes is possible especially when a slot die is used.

In a particular embodiment, a particular die head with downstream underwater granulation is used instead of the die strip described above, having the otherwise usual combination of extrudate take-off, water bath and granulator. The polymer melt passes through a die plate having circular holes which are preferably arranged in a circle, and is cut off by rotating knives and cooled in water, the polymer solidifying to more or less circular, bead-like particles. In the arrangement of the holes, however, arrangements other than circular ones and hole shapes other than circular ones are also commonly used.

In a further embodiment, the hot face cutting procedure is used instead of the discharge via die strip, water bath cooling and granulation, the polymer melt emerging from the die head not being cooled by liquid but, after emerging from the die head, being comminuted (granulated) after brief air cooling, while still in the hot state. The resulting granules are than further cooled, or are cooled during further processing if this is necessary. Further processing in the hot state is also conceivable.

The water content of the discharged polymer (the extrudate moisture content) is as a rule from 0.1 to 1.2% by weight, based on this polymer. The temperature of the polymer melt emerging from the discharge orifice is as a rule from 180 to 350° C., depending on the type of polymers used.

As is generally known, the various zones of an extruder can be individually heated or cooled in order to establish an optimum temperature profile along the screw axis. Furthermore, the fact that the individual sections of the extruder may usually be of different lengths is familiar to a person skilled in the art.

The temperatures and lengths of the individual sections, to be chosen in the specific case, differ depending on the chemical and physical properties of the components, mentioned above by way of example, and on their ratios.

The same also applies to the screw speed, which may vary within a wide range. A speed of the extruder screws of from 100 to 350 min$^{-1}$ may be mentioned here merely by way of example.

It is advantageous to design and to operate the extruder in such a way that, at a screw speed of from 100 to 350 min$^{-1}$, average shear rates of from 180 to 220 s$^{-1}$ are established. However, depending on the type, amount and properties of the components used, it may be advantageous to operate at average shear rates outside this range.

As is usual, the diameter of the two extruder screws may be constant over the length of the total screws. In a preferred embodiment, however, the screws consist of two sections of different diameters, the second (downstream) section having the larger diameter. The change in the screw diameter may be abrupt, ie. within a very short region of the screw, or gradual. It occurs in a region after the end of the section 4 in which the melt of the thermoplastic polymer B is fed in, and before the beginning of the first devolatilization section 6. The increase in diameter is preferably abrupt and preferably occurs directly before the beginning of the first devolatilization section.

As a rule, the diameter of the second screw section is from 1.02 to 1.20, preferably from 1.04 to 1.15, times the diameter of the first screw section. The barrel diameters change in a corresponding manner to the screw diameter.

In a preferred embodiment, the change in the screw diameters is accompanied by a change in the number of flights of the screw. The front screw section of smaller diameter preferably has three flights, whereas the rear section of larger diameter has, as a rule, two flights. In principle, however, single-flight screw sections are also conceivable.

Any polymer which has elastomeric properties and can be fed to an extruder may be used as elastomer component A. In particular, particulate rubbers are used, as stated at the outset. Rubbers which have a grafted-on shell of other generally nonelastomeric polymers are particularly preferred. In a preferred embodiment of the invention, the graft rubber types fed to the extruder as partially dewatered material contain up to 50, particularly preferably from 25 to 40% by weight of residual water.

An embodiment of the invention comprises a process in which the elastomer component A used is a graft rubber which is composed of two or more stages and in which the elastomeric base or graft stages are obtained by polymerization of one or more of the monomers butadiene, isoprene, styrene, alkylstyrene, $C_1$–$C_{10}$-alkyl esters of acrylic acid or of methacrylic acid and small amounts of other monomers, including crosslinking ones, and in which the hard graft stages are obtained by polymerizing one or more of the monomers styrene, alkylstyrene, acrylonitrile and methyl methacrylate. Graft particles A comprising polymers based on butadiene/styrene/acrylonitrile, n-butyl acrylate/styrene/acrylonitrile, butadiene/n-butyl acrylate/styrene/acrylonitrile, n-butyl acrylate/styrene/methyl methacrylate, butadiene/styrene/acrylonitrile/methyl methacrylate and butadiene/n-butyl acrylate/methyl methacrylate/styrene/acrylonitrile are preferred. Up to 10% by weight of functional polar monomers may be incorporated as polymerized units in the core and/or shell.

In this embodiment, styrene/acrylonitrile (SAN) copolymers, α-methylstyrene/acrylonitrile copolymers, polystyrene, polymethyl methacrylate, polyvinyl chloride or mixtures of these polymers may be used as thermoplastic polymers B.

SAN polymers, polymethyl methacylate (PMMA) or mixtures of these polymers are preferred.

Other suitable components B are copolymers based on styrene/maleic anhydride, styrene/imidated maleic anhydride, styrene/maleic anhydride/imidated maleic anhydride, styrene/methyl methacrylate, styrene/methyl methacylate/maleic anhydride, methyl methacylate/imidated maleic anhydride, styrene/imidated methyl methacrylate, imidated PMMA or mixtures of these polymers.

In the case of all of the stated thermoplastic polymers B, some or all of the styrene may be replaced by α-methylstyrene or styrenes alkylated in the nucleus.

Among the last-mentioned styrene copolymers B, those based on α-methylstyrene/acrylonitrile, styrene/maleic anhydride, styrene/methyl methacylate and copolymers with imidated maleic anhydride are preferred.

Known examples of the elastomer component A are polymers of conjugated dienes, such as butadiene and its derivatives, having an outer graft shell based on a vinylaromatic compound, for example an SAN copolymer. Also known are graft rubbers based on crosslinked polymers of $C_1$–$C_{10}$-alkyl esters of acrylic acid, such as n-butyl acrylate or ethylhexyl acrylate, grafted with polymers based on vinyl aromatic compounds and SAN copolymers. Graft rubbers which essentially contain a copolymer of conjugated dienes and $C_1$–$C_{10}$-alkyl acrylates, for example a butadiene/n-butyl acrylate copolymer, and an outer graft stage comprising SAN copolymer are also commonly used.

The preparation of such graft rubbers by the conventional methods, in particular by emulsion or suspension polymerization, is known.

Graft rubbers based on SAN-grafted polybutadiene are described, for example, in the publications DT 24 27 960 and EP-A 258 741, and those based on SAN-grafted poly-n-butyl acrylate in German Published Application DAS 12 60 135 and German Laid-Open Application DOS 3,149,358. Further details on SAN-grafted poly(butadiene/n-butyl acrylate) mixed rubbers are given in EP-A 62 901.

In the case of the graft rubbers mentioned in the last paragraph, copolymers of styrene and acrylonitrile are used as thermoplastic polymers B. They are known and some of them are also commercially available and have, as a rule, a viscosity number VN (determined according to DIN 53 726 at 25° C. as a 0.5% strength by weight solution of dimethylformamide) of from 40 to 160 ml/g, corresponding to an average molecular weight of from about 40000 to 200000.

The thermoplastic polymers B are preferably prepared by continuous mass or solution polymerization, the melt obtained being fed continuously directly to the extruder, for example by means of a melt pump, if necessary after removal of the solvent. However, preparation by emulsion, suspension or precipitation polymerization is also possible, the polymer being separated from the aqueous phase in an additional operation.

Details of the preparation process are described, for example, in Kunststoff-handbuch, Editors R. Vieweg and G. Daumiller, Vol. V Polystyrol, Carl-Hanser-Verlag, Munich, 1969, page 118 et seq.

If the elastomer component A is an SAN-grafted polybutadiene, incorporation of the SAN gives a molding material which is known as ABS (acrylonitrile/butadiene/styrene). If an SAN-grafted alkyl acrylate is used as component A, ASA molding materials (acrylonitrile/styrene/actylate) are formed.

In another embodiment, graft rubbers having a residual water content of up to 50% by weight and based on polydienes or polyalkyl acrylates or mixtures thereof and SAN and/or PMMA, which are composed of more than two graft stages, are used. Examples of such multistage graft particles are particles which contain a polydiene or polyalkyl acrylate or mixtures thereof as the core, a polystyrene or SAN polymer as the first shell and another SAN polymer having a different styrene/acrylonitrile weight ratio as the second shell, or particles comprising a polystyrene core, polymethyl methacrylate core or SAN polymer core, a first shell of polydiene or polyalkyl acrylate or mixtures thereof and a second shell of polystyrene, polymethyl methacrylate or SAN polymer. Further examples are graft rubbers comprising a polydiene core, one or more polyalkyl acrylate shells and one or more polymer shells of polystyrene, polymethyl methacrylate or SAN polymer or graft rubbers having a similar composition and containing an acrylate core and polydiene shells.

Copolymers having a multistage core-shell morphology and comprising crosslinked alkyl acrylate, styrene, methyl methacrylate and an outer shell of PMMA are also commonly used.

Such multistage graft rubbers are described, for example, in German Laid-Open Application DOS 3,149,046. Graft rubbers based on n-butyl acrylate/styrene/methyl methacrylate and having a shell of PMMA are described, for example, in EP-A 512 333, and such graft rubbers may also have any other structure corresponding to the prior art.

Such rubbers are used as impact modifiers for polyvinyl chloride and preferably for impact-resistant PMMA.

The stated SAN copolymers or PMMA or mixtures thereof are also preferably used as the thermoplastic polymers B.

If the elastomer component A is a core/shell polymer composed of a plurality of shells and based on n-butyl acrylate/methyl methacrylate and the polymer B is PMMA, impact-resistant PMMA is accordingly obtained.

The diameter of the particulate graft rubbers is from 0.05 to 20 μm. If these are the generally known graft rubbers of small diameter, the diameter is preferably from 0.08 to 1.5 μm, particularly preferably from 0.1 to 0.8 μm.

In the case of the large-particled graft rubbers advantageously prepared by means of suspension polymerization, the diameter is preferably from 1.8 to 18 μm, in particular from 2 to 15 μm. Such graft rubbers of large diameter are described, for example, in German Laid-Open Application DOS 4,443,886.

In this embodiment too, preferred component [sic] B are the stated SAN copolymers or PMMA or mixtures thereof.

In addition to the elastomer component A and the thermoplastic polymer B, the molding materials prepared by the novel process may also contain further components, in particular additives, such as lubricants and mold release agents, pigments, dyes, flameproofing agents, antioxidants, light stabilizers, fibrous and pulverulent fillers and reinforcing agents and antistatic agents in the amounts usual for these agents.

The further components are preferably first mixed with the elastomer component A or the thermoplastic polymer B or with mixtures of A and B. Mixing is carried out on mixing units known to a person skilled in the art.

The thermoplastic molding materials prepared by the process can be processed to moldings by the conventional methods. Extrusion (for pipes, profiles, fibers, films and sheets), injection molding (for shaped articles of all kinds) and calendering and rolling (for sheets and films) may be mentioned by way of example.

A substantial advantage of the novel process is that a considerable part of the residual water which is present in the partially dewatered elastomer component A is mechanically removed as early as the squeeze zones, so that little thermal energy must be used in the subsequent extruder sections for evaporating the remaining water. A substantial energy saving results.

A further advantage of the novel process is that the extruder can be operated at low [sic] temperatures than, for example, according to the process described in EP-A 534

235, so that the elastomer component A and the polymer consisting of the components A and B and, if required, the further components is [sic] processed in a gentler manner.

By incorporating a partially dewatered elastomer component A into the melt of a thermoplastic polymer B, it is possible, assuming compatibility or at least partial compatibility of the elastomer component with the thermoplastic polymer and sufficient heat stability, to prepare rubber-modified thermoplastic molding materials of various types.

Compared with the prior art processes, the novel process furthermore has the advantage that no Seiher barrels susceptible to blockage are used.

The novel arrangement of the extruder can be assembled in an economical manner with the aid of commercial extruder components according to the modular principle. Such components are available in the form of differently constructed screw sections and associated barrel sections, ie. shots, and permit exact adaptation of the extruder to the specific compounding problem.

EXAMPLES a) Extruder

A twin-screw extruder of the type ZSK 53 from Werner and Pfleiderer, Stuttgart, which comprises 13 shots, is used. Its arrangement is as follows in a downstream direction (the designation of the extruder sections which is used in the description is stated in brackets):

Shot 0: Length 3 $D_V$, unheated, with vent orifice at the top (deaeration section 1).

Shot 1: Length 3 $D_V$, unheated, with metering orifice at the top, which is provided with an ESB 45 metering means from Werner and Pfleiderer (metering section 2 for elastomer component A).

Shot 2: Length 3 $D_V$, unheated, with dewatering orifice at the top, which is provided with a retaining screw (first squeeze section 3, front part).

Shot 3: Length 3 $D_V$, unheated, without orifices, contains retarding elements (first squeeze section 3, rear part).

Shot 4: Length 3 $D_V$, unheated, without orifices, with conveying screw (second squeeze section 3', front part).

Shot 5: Length 3 $D_V$, unheated, with dewatering orifice at the top, which is provided with a retaining screw (second squeeze section 3', middle part).

Shot 6: Length 3 $D_V$, unheated, without orifices, contains retarding elements and a screw section with kneading blocks (second squeeze section 3', rear part).

Shot 7: Length 3 $D_V$, heated to 240° C., without orifices, with conveying screw (section 4 in which the melt of the thermoplastic polymer B is fed in, front part).

Shot 8: Length 3 $D_V$, heated to 240° C., with lateral orifice through which the polymer melt is introduced via a pipeline by means of a melt pump (section 4 in which the melt of the thermoplastic polymer B is fed in, rear part) and a screw section which contains kneading blocks (first plasticating section 5).

Shot 9: Length 3 $D_V$, heated to 240° C., without orifices, with a screw section which contains kneading blocks (second plasticating section 5').

Shot 10: Length 3 $D_H$, heated to 240° C., with devolatilization orifice at the top and conveying screw, operated under atmospheric pressure (first devolatilization section 6).

Shot 11: Length 3 $D_H$, heated to 240° C., with devolatilization orifice at the top and conveying screw, operated under atmospheric pressure (second devolatilization section 6').

Shot 12: Length 3 $D_H$, heated to 240° C., without orifices and with conveying screw (discharge zone 7, front part).

Termination: Die strip with cylindrical holes (discharge zone 7, rear part).

In the front region of the screw—shots 0 to 9—the screw diameter $D_V$ is 53 mm and the screw is of a three-flight design. In the rear section of the screw—shots 10 to 12—the screw diameter $D_H$ is 57 mm and the screw is a two-flight screw. In each case, the term screw denotes the twin screw arrangement, ie. both screws.

b) Polymer components used

The following graft rubbers were used as elastomer component A:

A-1: Graft rubber of the type polybutadiene (core)/styrene/acrylonitrile (shell).

Butadiene was polymerized in emulsion and the latex obtained was agglomerated to give a latex having an average particle size $d_{50}$ of 238 nm and was then subjected to graft polymerization with a mixture of styrene and acrylonitrile. Further details are given in German Published Application DAS 2,427,960, column 6, line 17 to column 7, line 27, but the precipitated graft polymer was filtered off with suction and was dewatered by means of a pneumatic dryer to a residual moisture content of 28% by weight.

A-2: Graft rubber of the type polybutyl acrylate (core)/styrene (first stage)/styrene-acrylonitrile (second stage)

n-Butyl acrylate was polymerized with dihydrodicyclopentadienyl acrylate as a crosslinking agent in emulsion in two steps to give a latex having an average particle diameter $d_{50}$ of 410 nm. A first stage comprising polystyrene and a second stage comprising styrene/acrylonitrile copolymer were grafted onto this latex by polymerization. With regard to the details, reference may be made to German Laid-Open Application DAS 3,149,358, page 15, line 12 to page 16, line 24, but the drying in a stream of air mentioned therein was replaced by centrifuging. The residual moisture content of the rubber used was 39% by weight.

A copolymer comprising 65% by weight of styrene and 35% by weight of acrylonitrile was prepared, as thermoplastic polymer B, by the continuous solution polymerization method, as described in Kunststoff-Handbuch, editors R. Vieweg and G. Daumiller, Vol. V Polystyrol, Carl-Hanser-Verlag Munich 1969, pages 122 to 124. The viscosity number VN (determined according to DIN 53 726 at 25° C. in a 0.5% strength by weight solution in dimethylformamide) was 80 ml/g.

The components A-1 and B give molding materials which are generally known as ABS (acrylonitrile/butadiene/styrene). The products obtained from the components A-2 and B are familiar as ASA molding materials (arcylonitrile/styrene/acrylate).

c) Measurements

One of the graft rubbers A and the polymer B were fed to the extruder. The water discharge and the rubber discharge in the first and second squeeze zones and the extrudate moisture content of the emerging end product were measured. These measurements were carried out gravimetrically.

The temperature of the water emerging in the squeeze zones was also measured in a customary manner. The amount of water emerging as steam was determined by calculating the difference between the initial residual water content and the total of the liquid water discharged.

The discharges of water, steam and rubber in kg/h were converted into percentages. The stated percentages are by weight and, for water and steam, are based on the water content of the rubber fed to the extruder (line marked with \*), which was set to 100, and, for rubber, are based on the throughput of moist rubber (line marked with \*\*), which was set to 100. The moisture content of the extrudate is based on the end product obtained.

TABLE

| Example | 1 | 3 |
|---|---|---|
| Elastomer component | A-1 | A-2 |
| Thermoplastic polymer | B | B |
| Rubber throughput [kg/h]\*\* | 50 | 85 |
| Feed of thermoplastic polymer melt [kg/h] | 84 | 84 |
| Water content of rubber [% by weight]\* | 28 | 39 |
| Extruder speed [min$^{-1}$] | 250 | 250 |
| 1st Squeeze section | | |
| Water discharge [kg/h] [1] | 7.0 = 50% | 24.4 = 73% |
| Rubber discharge [kg/h] [2] | 1.6 = 3% | 4.2 = 8% |
| Water temperature [° C.] | 26 | 34 |
| 2nd Squeeze section | | |
| Water discharge [kg/h] [1] | 2.4 = 17% | 0.7 = 2% |
| Rubber discharge [kg/h] [2] | 0.2 =< 1% | 0.03 =< 1% |
| Water temperature [° C.] | 81 | 88 |
| Devolatilization sections | | |
| Steam discharge [kg/h] [1] | 4.6 = 33% | 7.8 = 23% |
| Extrudate moisture content [% by weight] | 0.2 | 0.5 |

[1] Percentages based on line \* = 100
[2] Percentages based on line \*\* = 100

The examples show that from 50 to 73% by weight of the residual water initially contained in the partially dewatered rubber are removed as liquid water as early as the first squeeze section.

The rubber discharge is small, being from 3 to 8% by weight of the amount of moist rubber in the first squeeze section and less than 1% by weight in the second squeeze section.

We claim:

1. A process for the preparation of toughened thermoplastics by mechanically dewatering a solid, water-moist elastomer component A containing up to 50% by weight of residual water and mixing the resulting dewatered elastomer component A' with a thermoplastic polymer B in an extruder, wherein the solid, water-moist elastomer component A is obtained by producing a dispersion of elastomer particles in an aqueous solution and partially dewatering the dispersion of the elastomer particles by a suitable dewatering method until the solid, water-moist elastomer A results, and wherein the solid, water-moist elastomer component is fed to a twin-screw extruder which has corotating screws and essentially comprises, in the transport direction, one unheated metering section in which elastomer component A is fed to the extruder by a metering means, at least one unheated squeeze section which serves for dewatering and contains at least one retarding element and in each case at least one associated dewatering orifice, wherein no Seiher barrels are used as dewatering orifices, at least one section in which the thermoplastic polymer B is introduced as a melt into the extruder, at least one section provided with mixing, kneading or other plasticating elements or combinations of these elements, at least one devolatilization section which is provided with at least one devolatilization orifice and in which the residual water is removed as steam, and a heated discharge zone, and wherein the water emerging from the dewatering orifices is present partially or completely in the liquid phase.

2. The process of claim 1, wherein the dewatering orifices are each provided with a retaining screw.

3. The process of claim 1, wherein the discharge zone is terminated by a die head.

4. The process of claim 1, wherein the extruder has at least one section provided with mixing elements, kneading elements or other plasticating elements or combinations of these elements between a final squeeze section and the section in which the melt of the thermoplastic polymer B is fed in.

5. The process of claim 1, wherein, between a final squeeze section and a first devolatilization section, the extruder has at least one feed orifice for the melt of the thermoplastic polymer B and at least one mixing section following this feed orifice and, if required, at least one mixing section preceding this feed orifice.

6. The process of claim 1, wherein the two extruder screws each consist of two sections, the front section having a smaller diameter and comprising three flights and the rear section having a larger diameter and comprising two flights, and the screw geometries changing between the beginning of the first plasticating section, which is located behind the feed orifice of the thermoplastic polymer B, and the beginning of a first devolatilization section.

7. The process of claim 1, wherein at least one graft rubber having a residual water content of up to 50% by weight is used as elastomer component A.

8. The process of claim 1, wherein a graft rubber composed of two or more stages and containing a base comprising one or more of the monomers butadiene, styrene, alkylstyrene, alkyl acrylate, alkyl methacrylate and small amounts of other monomers, including crosslinking monomers, and a graft stage comprising styrene, alkylstyrene, acrylonitrile, methyl methacrylate and, if required, small amounts of other monomers, including crosslinking monomers, or mixtures of these monomers is used as elastomer component A, and a styrene-acrylonitrile copolymer, polystyrene, polymethyl methacrylate, polyvinyl chloride or a mixture of these polymers is used as thermoplastic polymer B.

9. The process of claim 1, wherein a graft rubber based on polybutadiene or polyalkyl acrylate or mixtures thereof as the base and a copolymer of styrene and acrylonitrile as the graft stage is used as elastomer component A, and a styrene-acrylonitrile copolymer as thermoplastic polymer B.

10. The process of claim 1, wherein a graft rubber composed of two or more stages and essentially consisting of polyalkyl acrylate and a copolymer of styrene and acrylonitrile is used as elastomer component A, and a styrene-acrylonitrile copolymer as thermoplastic polymer B.

11. The process of claim 1, wherein the elastomer A is a graft rubber having a diameter of from 0.05 to 20 μm.

\* \* \* \* \*

UNITED STATES PATENT AND TRADEMARK OFFICE
CERTIFICATE OF CORRECTION

PATENT NO.: 5,958,316

DATED: September 28, 1999

INVENTOR(S): GUENTHERBERG et al.

It is certified that error appears in the above-identified patent and that said Letters Patent is hereby corrected as shown below:

On the title page,

Insert the following priority information on the cover page:

--[30] Foreign Application Priority Data
Mar. 27, 1996 [DE] Germany ......... 195 11 142.7
Dec. 21, 1995 [DE] Germany ......... 195 47 976.9--.

In the Abstract, line 17, before "melt" insert --heated--.

Signed and Sealed this

Twenty-fifth Day of April, 2000

Attest:

Q. TODD DICKINSON

*Attesting Officer*    *Director of Patents and Trademarks*